United States Patent [19]

Tsubakimoto et al.

[11] Patent Number: 4,719,936

[45] Date of Patent: Jan. 19, 1988

[54] METHOD OF HOT TAPPING TYPE BRANCHING AND SPLIT JOINT USED THEREIN

[75] Inventors: Toshihiro Tsubakimoto, Minoo; Koziro Hori, Takarazuka; Toshio Shibabuti, Hashimoto, all of Japan

[73] Assignee: Osaka Gas Company Limited, Osaka, Japan

[21] Appl. No.: 470,501

[22] Filed: Feb. 28, 1983

[51] Int. Cl.⁴ ............................................. F16K 43/00
[52] U.S. Cl. ..................................... 137/15; 137/318; 138/92; 285/197; 408/87
[58] Field of Search ............... 137/15, 318; 138/92; 29/525; 408/87, 104, 105, 110, 111; 285/197

[56] References Cited

U.S. PATENT DOCUMENTS

| | | |
|---|---|---|
| 511,327 | 12/1893 | Eley ..................................... 137/318 |
| 1,507,887 | 1/1926 | Graves ................................. 285/197 |
| 2,188,607 | 1/1940 | Larry et al. .......................... 29/525 |
| 3,168,104 | 2/1965 | Mathis ................................. 138/92 |
| 3,401,957 | 9/1968 | McCright et al. ................. 285/197 |
| 3,527,483 | 9/1970 | Dashner ............................. 285/197 |
| 3,533,424 | 10/1970 | Wedge ............................... 137/318 |
| 3,867,964 | 2/1975 | Gardner ............................. 137/318 |
| 3,999,785 | 12/1976 | Blakeley ............................ 285/197 |
| 4,108,194 | 8/1978 | Harrison et al. .................. 137/318 |
| 4,127,141 | 11/1978 | Ledonne et al. ................... 137/318 |
| 4,205,697 | 6/1980 | Gebelius ............................ 137/318 |
| 4,408,636 | 10/1983 | Karpenko ............................ 138/92 |

Primary Examiner—G. L. Walton
Attorney, Agent, or Firm—Cushman, Darby & Cushman

[57] ABSTRACT

The disclosed invention provides a novel method of perforating a main pipeline while in service, and split joints suited to this method, in order to connect a branch pipeline thereto. According to this method, perforating work is carried out from an opposite side across the main pipeline to where the branch pipeline is connected, as distinct from known methods in which perforating work is carried out on the side of the main pipeline to which a branch pipeline is connected.

4 Claims, 13 Drawing Figures

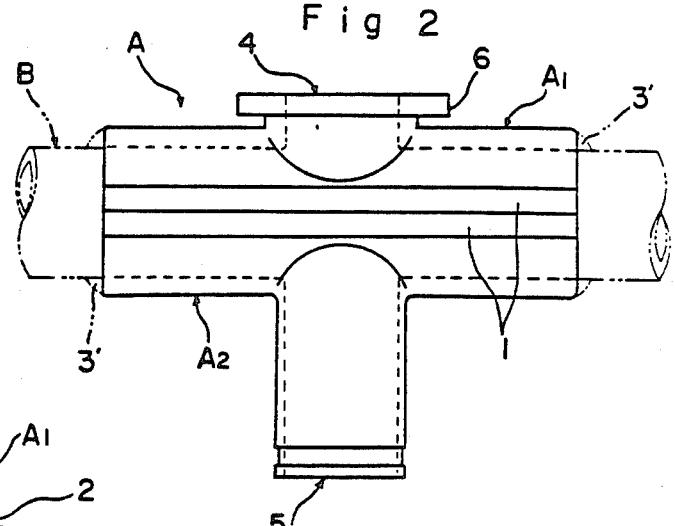
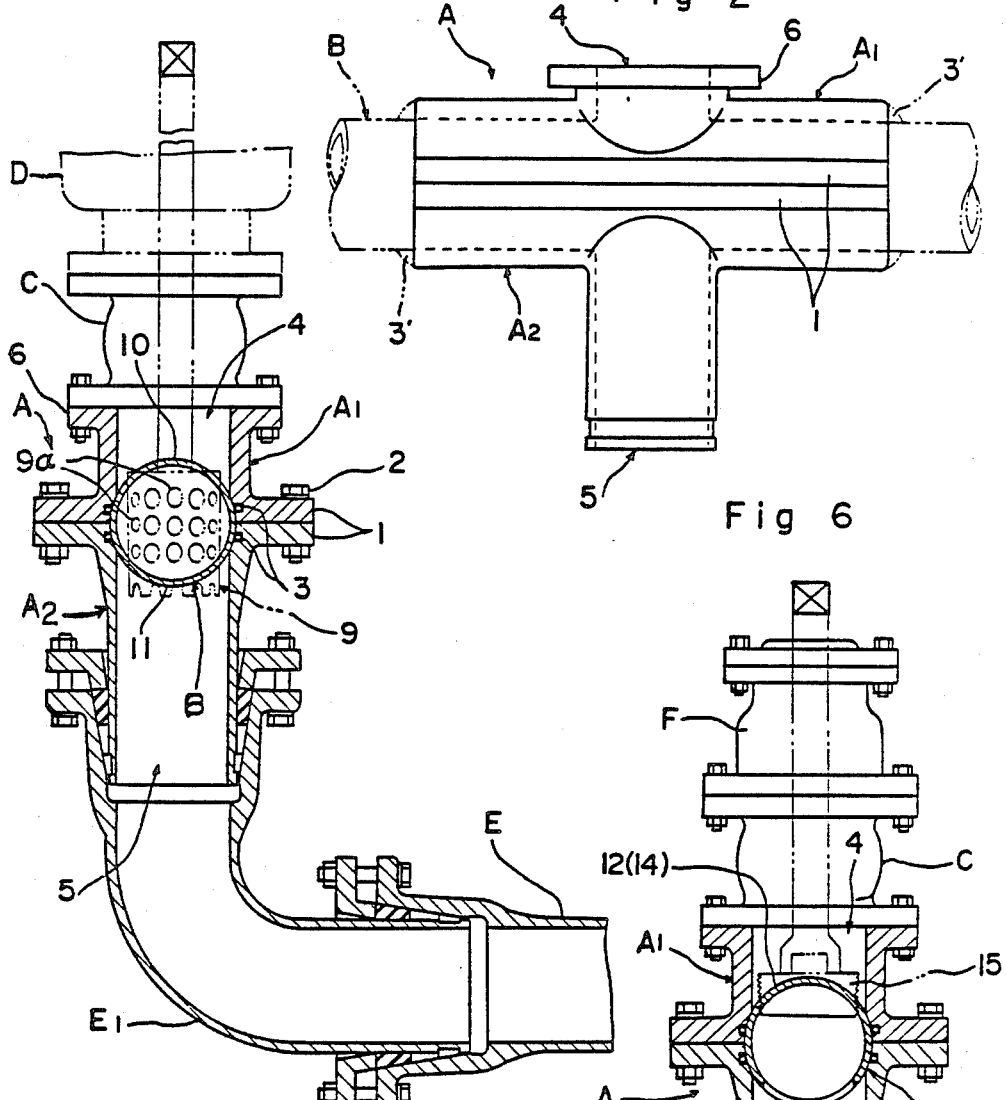
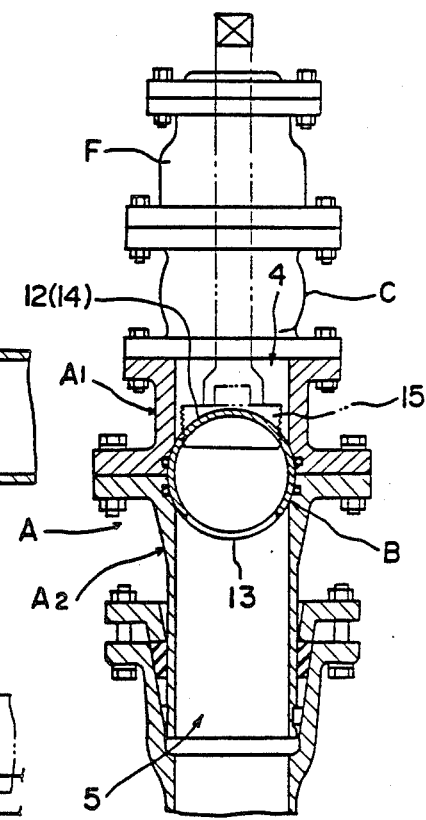
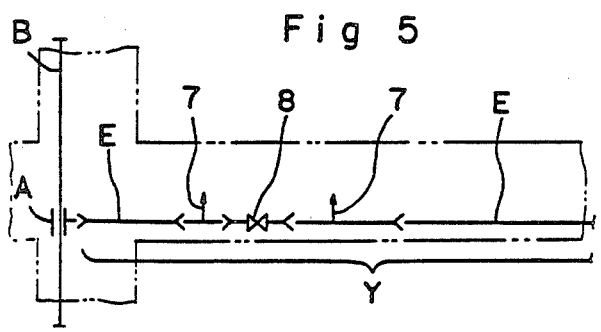

METHOD OF HOT TAPPING TYPE BRANCHING AND SPLIT JOINT USED THEREIN

BACKGROUND OF THE INVENTION

This invention relates to a method of hot tapping type branching, and more particularly to a method of connecting a branch pipeline to a main pipeline which is transmitting fluid such as town gas and establishing communication therebetween by hot tapping the main pipeline, i.e. perforating the main pipeline while in service, and to a split joint to be used in this method, wherein the two pipelines have an identical or like diameter.

In the most basic of known methods of this type, a bypass pipe is used to intercommunicate two points of the main pipeline and shut off and remove a main pipeline portion between the two points, then a T-shaped pipe is mounted between the two points and a branch pipeline is connected to the T-shaped pipe. Such a prior art method had many problems in that it required large scale bypassing work and troublesome pipe shutting work which also entailed excavation over large areas and were time-consuming.

The following two methods were developed in recent years to alleviate the above problems:

(I) A method used where the pressure is low: As shown in FIG. 10 of the accompanying drawings, a joint A' having a slide shutter 30 is mounted on a main pipeline B which is perforated by a hole saw 31 of a drill D' attached to the joint A'. Thereafter the shutter 30 is closed and the drill D' is replaced by a coupling pipe E' which connects a branch pipeline E to the joint A' as shown in FIG. 11. This method is executed in the following order:

(i) A gastightness test is carried out on a newly installed section Y comprising a pre-connected series of branch pipes E.

(ii) After a gastightness test for an outlet section X at the main pipeline B and the joint A', the drill D' is attached to perforate the main pipeline B.

(iii) The outlet section X and the newly installed section Y are brought into intercommunication through a coupling section Z comprising the coupling pipe E'.

(II) A method used where the pressure is high: As shown in FIG. 12, this method employs a joint A" having no slide shutter and a shutting device having strong resistance to pressure such as a valve C', and is executed in the same manner and the order as the method (I).

These two methods (I) and (II) dispensed with the work of laying a bypass for the main pipeline B, the main pipeline shutting operation and the removal of a portion of the main pipeline B, and greatly alleviated the problems of the prior method. However, in both of these methods, as clearly seen from the split joints A' and A" used therein, the perforating work and the connection of a branch pipeline are carried out using a common opening and in the same direction, and therefore the perforating work requires a considerably large space in the branching-out direction. Particularly in the case of underground pipelines, a large area has to be excavated and, when there is another pipeline nearby, the required space can hardly be secured. This is the disadvantage of the methods (I) and (II).

The method (I) has a further disadvantage that, in addition to troublesome final connection work, the gastightness test of the coupling section Z cannot be conducted with a pressure higher than that of the transmitted fluid, making it difficult to provide the test with a high degree of reliability. The method (II) permits the newly installed section to be pre-connected, but leaves the valve C' at the outlet section X usually located under an intersection of roads, which poses a problem of maintenance.

Taking a view that these varied problems spring from the fact that the perforating work and the branching work are carried out in the same direction, a further method has recently been provided wherein the two steps above are carried out in different directions, which is described with reference to FIG. 13. As seen, a main pipeline B is fitted with a split joint OA including a drill receiving opening O4 and an outlet opening O5 for coupling to a branch pipeline E, the two openings having axes crossing each other at right angles. After coupling the branch pipeline E to the outlet opening O5, drill OD is fixed to the drill receiving opening O4 across a shutting device C, and then a peripheral wall of the main pipeline B opposed to the outlet opening O5 is cut off by a hole saw O9 of the drill OD thereby establishing communication between the main pipeline B and the branch pipeline E. Thereafter the shutting device C is removed and the drill receiving opening O4 is closed by screwing in a plug and placing a blind flange. Because the perforating work and the branching work are carried out in different directions according to this method, the perforating work no longer requires a large space in the branching-out direction as was the case with the prior methods (I) and (II). Also, because the branch pipeline E is connected prior to the perforating work, the entire branch pipeline E, including the split joint O4, can be subjected to a gastightness test using a higher pressure than the fluid pressure inside the main pipeline B. In addition to the above advantages, this method permits the shutting device C to be removed, whereby its maintenance is no longer necessary.

However, the perforating work according to this method has a problem which may more than offset the above advantages, and therefore it is of primary importance to solve this problem for its practical application.

The problem lies in the mode of the perforating work in which the hole saw O9 cuts the peripheral wall of the main pipeline opposed to the outlet opening O5 gradually from one peripheral point to another, that is to say the hole saw O9 operates in a position greatly displaced from a plane crossing the axis of the main pipeline B. Thus, at the initial stage of cutting a forward end of the hole saw O9 is prone to slipping on the surface of the main pipeline B and is subjected to a strong reaction force in a sideways direction away from the main pipeline B, which hamper the perforating work itself, result in a perforation area different from what is desired, and causes damage or other trouble to the hole saw or its rotating mechanism through overstrain.

As noted above, the prior methods (I) and (II) and the method proposed recently of hot tapping type branching and the split joints used therein have varied problems.

SUMMARY OF THE INVENTION

The object of this invention is to provide a novel and useful method of hot tapping type branching and split joints used therein which eliminate the problems of the prior art.

In order to achieve this object, the method according to this invention comprises the steps of mounting the joint on the main pipeline, the joint including an outlet opening for communication with the main pipeline and a drill receiving opening disposed opposite the outlet opening across the main pipeline, connecting the branch pipeline to the outlet opening of the joint and carrying out a fluidtightness test thereon, forming a perforation in a peripheral wall of the main pipeline opposed to the drill receiving opening and the perforation in a peripheral wall thereof opposed to the outlet opening by using a drill through the drill receiving opening, thereby to establish communication between the main pipeline and the branch pipeline through the perforated opposed to the outlet opening, and withdrawing the drill and closing the drill receiving opening or the perforation opposed thereto.

The above method effects the perforating work and the branching-out work in different directions, and does not require a large space for the perforating work in the branching-out direction as was the case with the prior methods (I) and (II). Therefore, only a small amount of earth has to be dug for working on underground pipelines, which helps toward high efficiency of operation, and adjacent pipelines do not get in the way of operation.

Furthermore, the present method permits the entire branch pipeline to be connected to the main pipeline prior to perforating the latter, which dispenses with the troublesome final connection work as in the prior method (I). Therefore, a fluidtightness test can be carried out on the entire branch pipeline, including the joint, using a higher pressure than the fluid pressure inside the main pipeline, which improves the reliability of the test. Unlike the prior method (II), the shutting device need not be left adjacent a branching position usually located under an intersection of roads, eliminating the necessity of subsequent maintenance work for the shutting device.

Particularly in contrast with the recently proposed method, the method according to this invention effects the perforating work and the branching-out work in opposite directions across the main pipeline. This feature permits the hole saw of the drill to operate on an axis substantially crossing the axis of the main pipeline and firmly and stably resist the reaction force acting along the axis thereof at the time of cutting. Therefore, the hole saw and its rotating mechanism are not overly strained and perforations having desired shape and size can be formed in an efficient manner. The present invention has thus overcome all of the problems of the prior art.

A split joint according to this invention to be used in the described hot tapping method comprises a pair of split joint members for mounting peripherally on the main pipeline and adapted to be securely fixed thereto in fluid-tight condition by tightening together opposite flanges of the split joint members, one of the split joint members including a drill receiving opening to receive a drill across on-off shutter means for perforating the main pipeline, the drill receiving opening having an axis on or adjacent a plane crossing an axis of the main pipeline, and the other of the split joint members including an outlet opening for coupling to a branch pipeline, at least a base portion of the outlet opening having an axis opposed to the axis of the drill receiving opening across the axis of the main pipeline and lying on or adjacent the plane crossing the axis of the main pipeline.

Since this split joint has the drill receiving opening and the outlet opening opposite to each other across the axis of the main pipeline, the hole saw can operate on an axis substantially crossing the axis of the main pipeline to perforate the main pipeline, thereby allowing the method of this invention to be executed reliably and effectively.

Other modes and advantages of the method of hot tapping type branching and the split joint used therein according to this invention will be apparent from the following description.

BRIEF DESCRIPTION OF THE DRAWINGS

FIG. 1 is a sectional front view showing a split joint according to the invention, FIG. 2 is a side view of the split joint, FIGS. 5 through 7 show how to execute the branching method of the invention, in which FIG. 5 is an overall schematic view, and FIGS. 6 and 7 are sectional views of a principal part, FIGS. 10 through 13 show the prior art, in which FIG. 10 is a partly sectional side view, FIGS. 11 and 12 are schematic overall views, and FIG. 13 is a sectional front view.

DETAILED DESCRIPTION OF THE PREFERRED EMBODIMENTS

Figure 3:
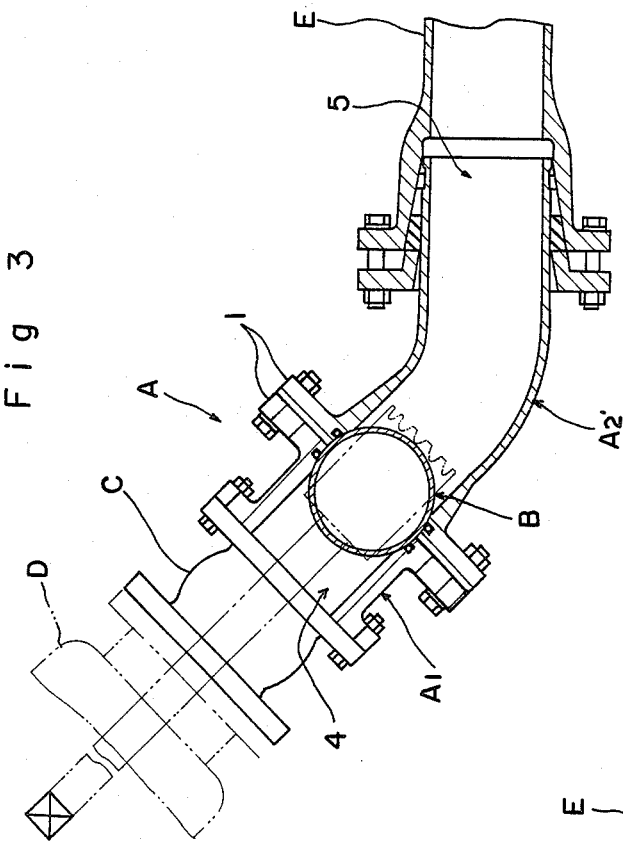
FIGS. 3 and 4 are sectional front views each showing a modified split joint.

First, examples of split joint used in the method of this invention are described with reference to FIGS. 1 through 4. FIGS. 1 and 2 show a hot tapping type split joint A comprising a pair of split joint members A1, A2 as mounted peripherally on a main pipeline B, which are secured thereto by tightening together two pairs of opposite flanges 1 by means of bolts and nuts 2 or the like. The split joint members A1, A2 are held together in a fluidtight condition by the presence of sealing elements 3 fitted in inner walls of the split joint members A1, A2. Instead of using the bolts and nuts 2, the split joint members A1, A2 may be welded together in which case the flanges 1 may be dispensed with. Furthermore, the sealing elements 3 may also be dispensed with by welding the ends of the two split joint members A1, A2 tightly to the main pipeline B as at 3' in FIG. 2. One of the split joint members A1 includes an opening 4 to receive and attach a drill D across an on-off shutter device C such as a valve or the like so as to permit the drill D to advance to and withdraw from the main pipeline B. The opening 4 has an axis on or adjacent a plane crossing an axis of the main pipeline B. The other split joint member A2 includes an outlet opening 5 for coupling to a branch pipeline E. The outlet opening 5 has an axis opposed to the axis of the drill receiving opening 4 across the axis of the main pipeline B and lying on or adjacent the plane crossing the axis of the main pipeline B. A flange 6 is provided integrally with and outwardly of the drill receiving opening 4 for removably securing the shutter device C.

Figure 4:
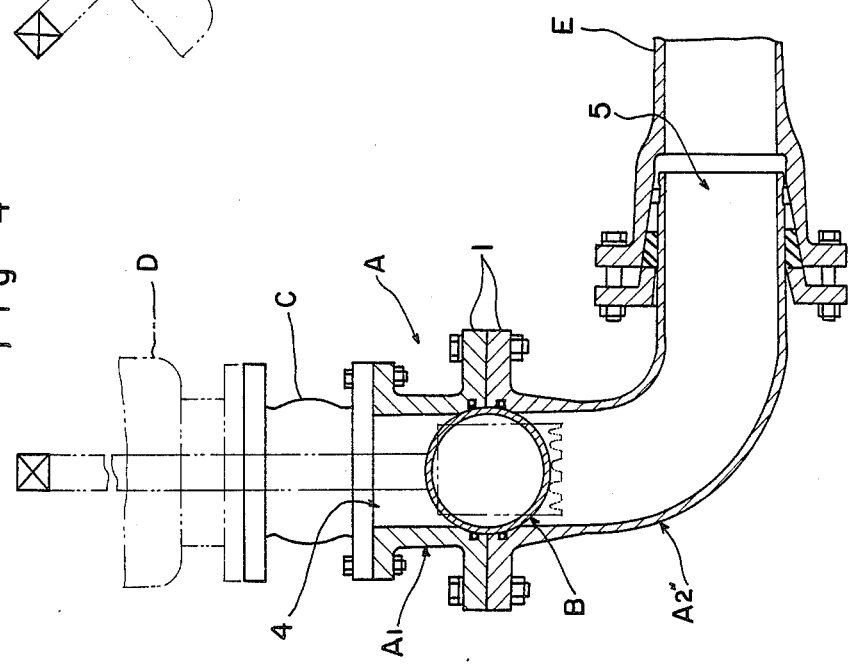

The outlet opening 5 is equal or about equal in inside diameter to the main pipeline B and the branch pipeline E. The axis of the outlet opening may be substantially in alignment only at its base portion with the axis of the drill receiving opening 4. FIGS. 3 and 4 show other examples of split joint member A2' and A2" which comprise bend pipes with any optional angles providing the outlet opening 5. While the drawings show the outlet opening 5 inserting into a socket end of the branch pipeline E, the arrangement may be the other way around or, alternatively, they may be interconnected via flanges or by welding. Furthermore, a 90 degree bend pipe E1 is shown as a branch pipe directly coupled to the outlet opening 5. This bend pipe E1 may have an angle other than 90 degrees, or a T-shaped pipe may be used instead.

The method of this invention will now be described in sequence where the split joint A of FIGS. 1 and 2 is used. Referring to FIG. 1, (1) Mount the split joint A on the main pipeline B.

(2) Lay a newly installed section Y by pre-connecting a series of branch pipes E to the outlet opening 5. Where the pressure is high, it is desirable to provide a release pipe 7 and a shutter device 8 at intermediate positions of the newly installed section Y. The shutting device 8 should desirably be located away from an intersection of roads and where its maintenance can be made conveniently.

(3) Attach the shutting device C to the drill receiving opening 4.

Note that the steps (2) and (3) may be carried out in the opposite order or at the same time.

(4) Carry out a fluidtightness test on the entirety of the newly installed section Y including the split joint A. This test can be and should desirably be made using a greater pressure than that of the fluid inside the main pipeline B. To carry out the test, a blind flange instead of the shutter device C may be attached at the step (3). In that case the blind flange is replaced by the shutting device C after the test.

(5) Attach the drill D to the shutting device C, open the shutting device C to permit the hole saw 9 to advance through the opening 4 into the split joint A, and cut off a peripheral wall 10 and then a peripheral wall 11 of the main pipeline B to form perforations 12 and 13. The hole saw 9 includes a plurality of pores arranged in axial and peripheral directions on its wall in order not to reduce the amount of fluid transmission during the perforating operation. The main pipeline B and the newly installed section Y are now in communication with each other through the perforation 13 opposed to the outlet opening 5. Where the transmitted fluid is at high pressure, the shutting device 8 on the newly installed section Y is closed to effect air purge through the release pipe 7 upstream thereof. Following the perforating operation, a female screw 14 is threaded in the perforation 12 opposd to the drill receiving opening 4 (Reference is to be made to phantom lines in FIG. 1 for this step).

(6) Withdrawn the hole saw 9, close the shutting device C, and remove the drill D.

(7) Attach a stopper plug fitting device F to the shutter device C in place of the drill D as shown in FIG. 6, open the shutter device C, and fit a stopper plug 15 into mesh with the female screw 14 in the perforation 12 opposed to the drill receiving opening 4.

Figure 7:
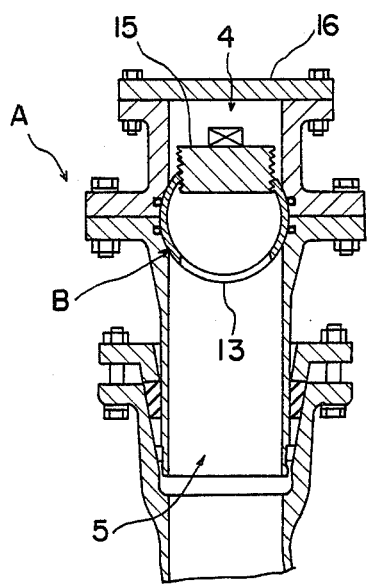

(8) Remove the shutting device C and attach a blind flange 16 to the split joint A outwardly of the plug 15 as shown in FIG. 7.

(9) Carry out air purge throughout the newly installed section Y by operating the shutter device 8 (only in case the shutter device 8 was closed during the step (5) above).

Figure 8:
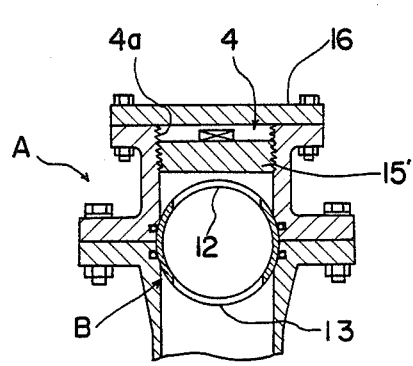
FIGS. 8 and 9 are sectional front views each showing a different plug.
Figure 9:
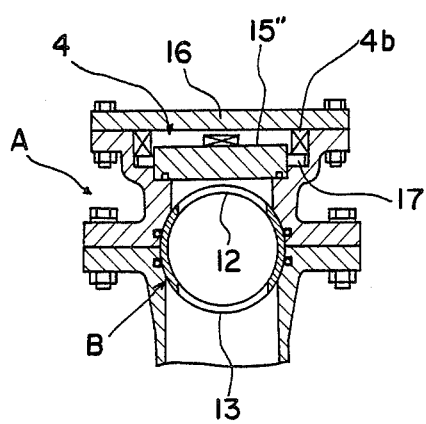
Figure 10:
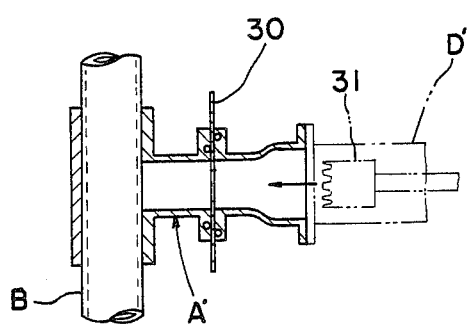
Figure 11:
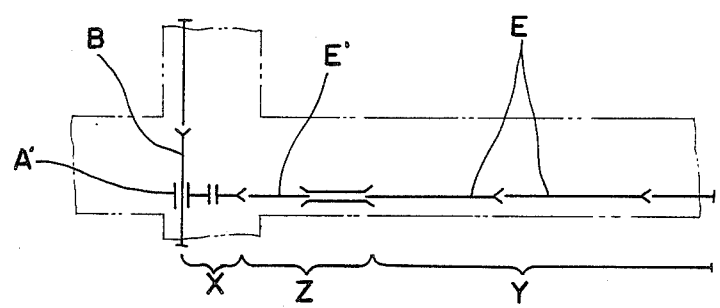
Figure 12:
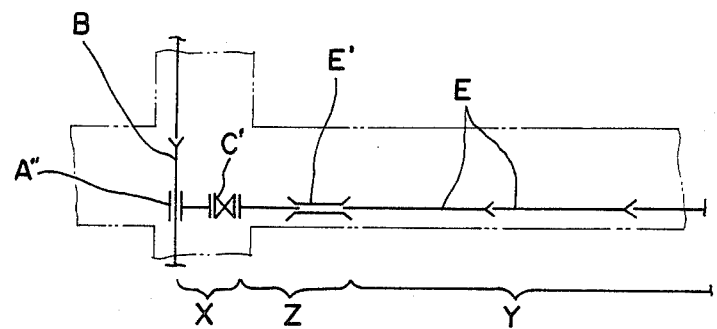
Figure 13:
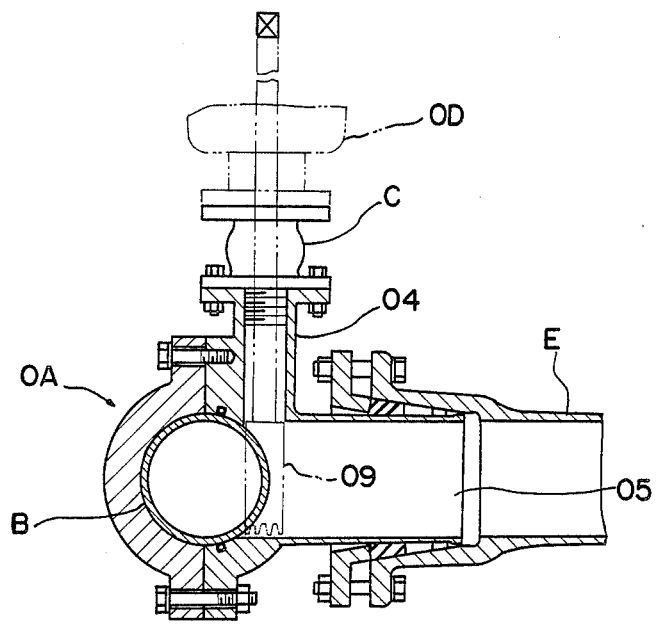

As a variation of closure by the plug 15, a plug 15' may be placed in mesh with a female screw 4a defined in the drill receiving opening 4 as shown in FIG. 8. In another variation as shown in FIG. 9, the drill receiving opening 4 defines grooves 4b running longitudinally and then peripherally, and a plug 15'' having projections 17 is dropped and turned to cause the projections 17 to engage the grooves 4b thereby fixing the plug 15'' in position. However, the stopper plug 15 fitted directly onto the main pipeline B is effective to prevent the split joint A from inadvertently turning around the main pipeline B when the stopper plug 15 abuts the inside of the split joint A.

While the method of this invention has been described where the split joint A comprising the split joint members A1, A2 as shown in FIGS. 1 and 2 is used, the same advantages may of course be expected from the use of the split joint A comprising the split joint members A1, A2' as shown in FIG. 3 or the split joint comprising the split joint members A1, A2'' as shown in FIG. 4.

The method of this invention is particularly effective where the pipelines, especially the main pipeline, are installed underground since only a small amount of earth has to be dug, but is applicable also to pipelines on or above the ground.

We claim:

1. A method of hot tapping type branching wherein a branch pipeline (E) is connected to a main pipeline (B) establishing communication therebetween through a perforation (13) formed in the main pipeline (B) and across a joint (A) mounted on the main pipeline (B), the main pipeline (B) and the branch pipeline (E) having an identical or like diameter, and the joint (A) including an outlet opening (5) for communication with said pipeline (B) and a drill receiving opening (4) disposed opposite said outlet opening (5) across said main pipeline (B), the joint (A) comprising a pair of split joint members (A1, A2) having opposite flanges (1) which are tightened together to securely mount the joint members on said main pipeline in fluid-tight condition, said method comprising the steps of;

mounting said joint (A) on said main pipeline (B), connecting said branch pipeline (E) to said outlet opening (5) of the joint (A) and carrying out a fluidtightness test thereon;

attaching a drill (D) having a hole saw (9) to a portion of said joint (A) defining said drill receiving opening (4) and forming a first perforation (12) in a peripheral wall (10) of said main pipeline (B) opposed to said drill receiving opening (4) and immediately thereafter a second perforation (13) in a peripheral wall (11), thereof opposed to said outlet opening (5) by using said hole saw (9) through said drill receiving opening (4), thereby to establish communication between said main pipeline (B) and said branch pipeline (E) through said second perforation, and thereby to thread a female screw (14) in the perforation (12); and removing said drill (D) and attaching a stopper plug fitting device (F) in place of said drill to thereby fit a stopper plug (15) into mesh with the female screw (14) so as to close said perforation (12) whereby the split joint (A) is prevented from inadvertently turning around the main pipeline (B) when the stopper plug (15) abuts the inside of the split joint A.

2. A method of hot tapping a branching pipeline at the point of pipe juncture, said method comprising steps of:

mounting, at the point of pipe juncture, a joint on a main pipe, said joint having two halves with an aperture in each half, said apertures being aligned;

connecting said branch pipe to the first of said apertures of said joint;

attaching a drilling device to the second of said apertures of said joint;

forming a first perforation in said main pipe of said drilling device attached to said second joint aperture;

forming a second perforation in said main pipe axially aligned and opposite said first perforation so as to establish communication between said first and second apertures of said joint;

threading a female screw into said first perforation of said main pipe; and fitting a stopper plug into said female screw so as to close said first perforation and more firmly secure said joint to said main pipe and to prevent inadvertent turning when said stopper plug abuts at least a portion of the inside of said joint.

3. A method according to claim 2 further including the step of performing a fluid-tightness test after the step of connecting said branch pipe to the first of said joint apertures.

4. A method according to claim 2 wherein said joint is mounted to said main pipe by bolted flanges.

* * * * *